US012590240B2

(12) United States Patent
Christanti et al.

(10) Patent No.: US 12,590,240 B2
(45) Date of Patent: Mar. 31, 2026

(54) METHODS AND COMPOSITIONS USING DISSOLVABLE GELLED MATERIALS FOR DIVERSION

(71) Applicant: SCHLUMBERGER TECHNOLOGY CORPORATION, Sugar Land, TX (US)

(72) Inventors: Yenny Christanti, Houston, TX (US); Konstantin Viktorovich Vidma, Sugar Land, TX (US); Changsheng Xiang, Houston, TX (US); Samuel Danican, Sugar Land, TX (US); Valerie Gisele Helene Lafitte, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/606,269

(22) Filed: Mar. 15, 2024

(65) Prior Publication Data

US 2024/0218232 A1    Jul. 4, 2024

Related U.S. Application Data

(63) Continuation of application No. 17/754,732, filed as application No. PCT/US2020/054944 on Oct. 9, 2020, now Pat. No. 11,932,807.

(Continued)

(51) Int. Cl.
*E21B 33/138* (2006.01)
*C09K 8/508* (2006.01)
(Continued)

(52) U.S. Cl.
CPC ............ *C09K 8/5083* (2013.01); *C09K 8/514* (2013.01); *E21B 33/1208* (2013.01);
(Continued)

(58) Field of Classification Search
CPC .............................. C09K 8/514; E21B 33/138
(Continued)

(56) References Cited

U.S. PATENT DOCUMENTS 6,367,548 B1    4/2002    Purvis et al.
7,004,255 B2    2/2006    Boney
(Continued)

FOREIGN PATENT DOCUMENTS

RU        2636526 C2    11/2017
RU        2666800 C1     9/2018

OTHER PUBLICATIONS

Search Report and Written Opinion of International Patent Application No. PCT/US2020/054944 on Jan. 20, 2021, 11 pages.
(Continued)

*Primary Examiner* — William D Hutton, Jr.
*Assistant Examiner* — Ashish K Varma
(74) *Attorney, Agent, or Firm* — Kyle R. Miiller

(57) ABSTRACT

A wellbore treatment fluid is disclosed herein, the fluid comprising a butenediol vinyl alcohol copolymer. Also, a wellbore treatment fluid comprises a dissolvable material capable of forming a gel upon hydration, the dissolvable material having a cylindrical cross-sectional shape. Methods of treating a subterranean formation includes introducing a treatment fluid comprising a butenediol vinyl alcohol copolymer, and creating a plug with the treatment fluid.

15 Claims, 4 Drawing Sheets

Related U.S. Application Data

(60) Provisional application No. 62/913,929, filed on Oct. 11, 2019.

(51) Int. Cl.
  *C09K 8/514* (2006.01)
  *E21B 33/12* (2006.01)

(52) U.S. Cl.
  CPC ........ *E21B 33/138* (2013.01); *C09K 2208/08* (2013.01); *C09K 2208/28* (2013.01); *E21B 2200/08* (2020.05)

(58) Field of Classification Search
  USPC ........................................................ 166/285
  See application file for complete search history.

(56) References Cited

U.S. PATENT DOCUMENTS

| | | | |
|---|---|---|---|
| 7,380,600 B2 | 6/2008 | Willberg et al. | |
| 7,565,929 B2 | 7/2009 | Bustos et al. | |
| 8,109,335 B2 | 2/2012 | Luo et al. | |
| 8,905,133 B2 | 12/2014 | Potapenko et al. | |
| 2006/0185848 A1 | 8/2006 | Surjaatmadja et al. | |
| 2010/0212906 A1 | 8/2010 | Fulton et al. | |
| 2011/0226479 A1 | 9/2011 | Tippel et al. | |
| 2014/0048260 A1* | 2/2014 | Reddy | C09K 8/887 |
| | | | 166/279 |
| 2016/0003022 A1 | 1/2016 | Rothrock | |
| 2016/0122618 A1* | 5/2016 | Nguyen | C04B 28/021 |
| | | | 507/104 |
| 2017/0198191 A1* | 7/2017 | Potapenko | C09K 8/516 |
| 2017/0342307 A1* | 11/2017 | Vasquez | C09K 8/536 |
| 2021/0130504 A1* | 5/2021 | Kim | C08L 7/00 |

OTHER PUBLICATIONS

Russian Office Action and Search Report; Application No. 2022112106/03(025430); Dated Jan. 30, 2024; 18 pages with English Translation.

* cited by examiner

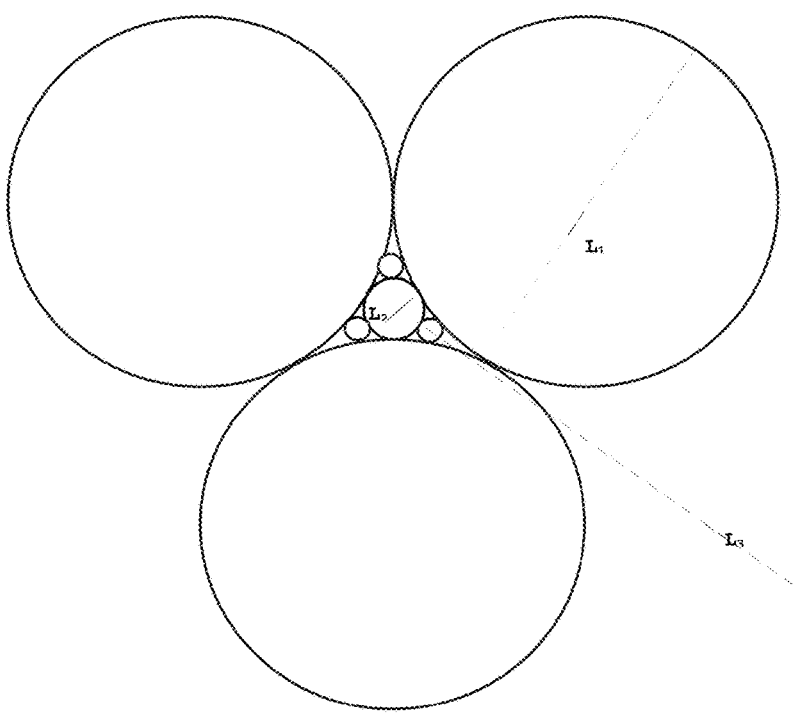
FIG. 3
FIG. 4
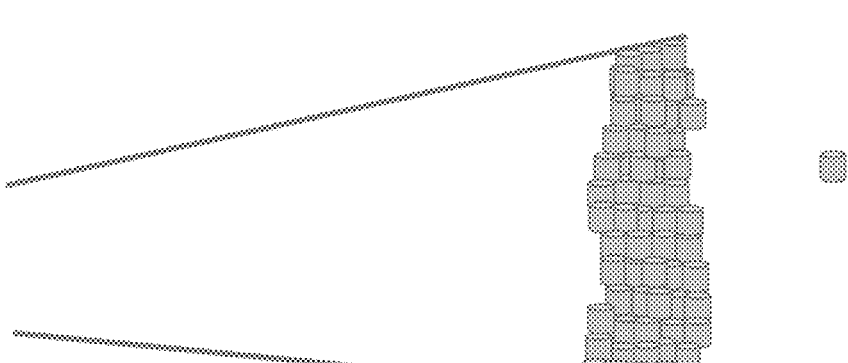
⬤ Dissolvable particle

METHODS AND COMPOSITIONS USING DISSOLVABLE GELLED MATERIALS FOR DIVERSION

PRIORITY

This application is a continuation of U.S. Nonprovisional application Ser. No. 17/754,732, filed on Apr. 11, 2022, which is a National Stage Entry of International Application No. PCT/US2020/054944, filed on Oct. 9, 2020, which claims the benefit of U.S. Provisional Application No. 62/913,929, filed on Oct. 11, 2019.

BACKGROUND

The statements in this section merely provide background information related to the present disclosure and may not constitute prior art.

Some embodiments relate to methods applied to a wellbore penetrating a subterranean formation, and more particularly, methods for zonal isolation.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

In hydraulic and acid fracturing, a first, viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. These types of materials are well known to those skilled in the art. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Occasionally, hydraulic fracturing can be done without a highly viscosified fluid (i.e., slick water) to minimize the damage caused by polymers or the cost of other viscosifiers.

Hydraulic and acid fracturing of horizontal wells, as well as multi-layered formations, frequently require using diverting techniques in order to enable fracturing redirection between different zones. In other cases, the generation of highly conductive fractures (natural or induced) during fracturing may impede the creation of new fractures. Thus, fracturing fluids formulated with a diverting agent, capable of temporary or permanent bridging (i.e., plugging) existing fractures, divert flow of fracturing fluids from regions of high permeability to those of lower permeability, such as where stimulation will be more effective. The list of these diverting methods includes, but not limited to, using mechanical isolation devises such as packers and wellbore plugs, setting bridge plugs, pumping ball sealers, pumping slurred benzoic acid flakes and removable/degradable particulates. As well, other treatment may require use of diverting techniques.

Treatment diversion with particulates is typically based on bridging the particles of diverting material behind a casing and forming a plug by accumulating the rest of the particles at the formed bridge. Several typical problems related to treatment diversion with particulate materials are: reducing bridging ability of diverting slurry during pumping because of dilution with wellbore fluid (interface mixing), necessity of using relatively large amount of diverting materials, and poor stability of some diverting agents during pumping and during subsequent treatment stage.

In other cases, during the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In other aspects, lost circulation may be a recurring drilling problem, characterized by loss of drilling mud into downhole formations. It can occur naturally in formations that are fractured, highly permeable, porous, cavernous, or vugular. These earth formations can include shale, sands, gravel, shell beds, reef deposits, limestone, dolomite, and chalk, among others. Other problems encountered while drilling and producing oil and gas include stuck pipe, hole collapse, loss of well control, and loss of or decreased production.

Lost circulation may be controlled by including an additive in fluids injected into wellbores. The most common additive used to control or cease lost circulation is bentonite which will seal small holes or fractures. Bentonite, in higher concentrations, increases viscosity and slows the fluid flow into the surrounding rock. Other solids, such as ground paper, ground corn cobs and sawdust, have also been used to control fluid loss. Polymers are also sometimes used to increase the viscosity of a wellbore fluid and to control fluid loss. Polymer additives, however, are generally more expensive than particulates such as bentonite.

Methods and compositions disclosed herewith relate to diversion, zonal isolation or techniques thereof.

SUMMARY

In an aspect, a method of treating a subterranean formation penetrated by a wellbore is disclosed. The method may include introducing a treatment fluid into the wellbore whereby the treatment fluid comprises a first component comprising vinyl alcohol polymer, butenediol vinyl alcohol copolymer for example, as a diverting agent, and creating a plug with the treatment fluid.

BRIEF DESCRIPTION OF THE DRAWINGS

FIG. 3 illustrates particles size distribution for reducing plug permeability, in accordance with aspects of the present disclosure.

FIG. 4 illustrates a near wellbore diversion pack, in accordance with aspects of the present disclosure.

DETAILED DESCRIPTION

Figure 1:
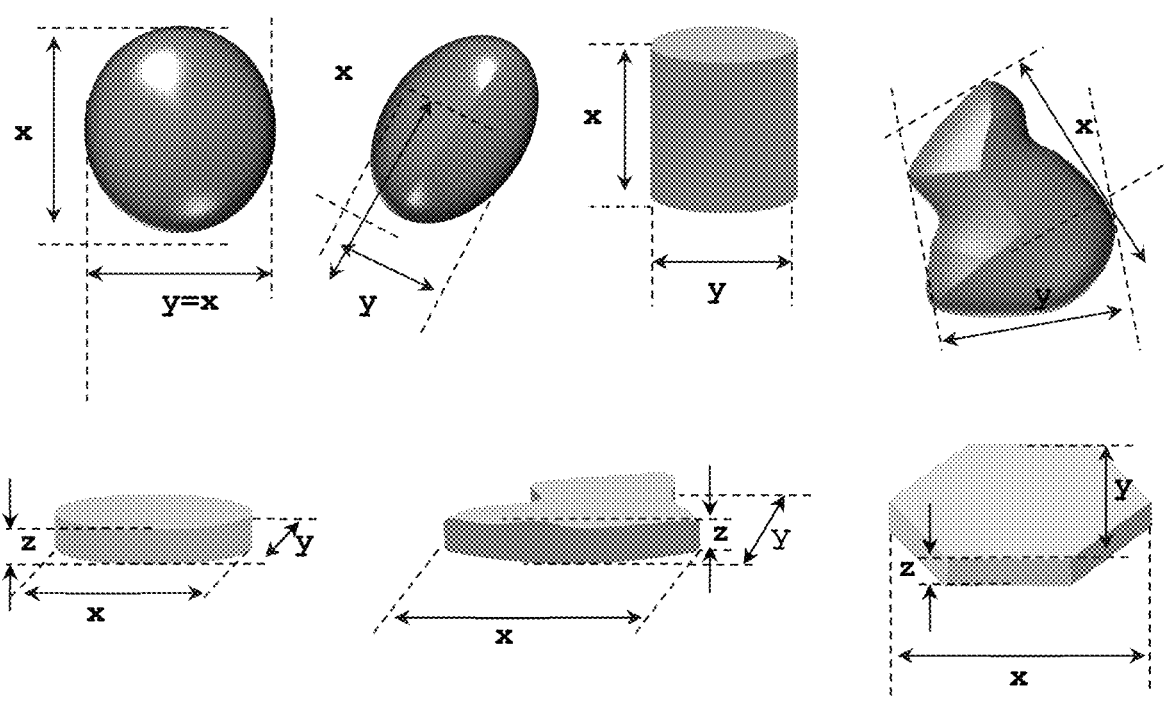
FIG. 1 illustrates particles and flakes, including dimensions, in accordance with aspects of the present disclosure.

At the outset, it should be noted that in the development of any actual embodiments, numerous implementation-specific decisions must be made to achieve the developer's specific goals, such as compliance with system and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a wellbore, by pumping fluid at very high pressures (pressure above the determined closure pressure of the formation), in order to increase production rates from a hydrocarbon reservoir. The fracturing methods otherwise use conventional techniques known in the art.

Vinyl Alcohol Copolymer

The present disclosure contemplates dissolvable materials for ultralow temperature diversion in fracturing treatment. Such treatment fluids may comprise dissolvable vinyl alcohol copolymer based particulates (e.g., butenediol vinyl alcohol copolymer) as a temporary diverting agent. In an aspect, the treatment fluids may comprise about at least 0.5 wt % butenediol vinyl alcohol copolymer in its composition. In embodiments, treatment fluids herein may comprise up to about 5.0 wt % butenediol vinyl alcohol copolymer in its composition. The butenediol vinyl alcohol copolymer, a biodegradable and eco-friendly polymer, may be capable of bridging narrow portions of the fractures such as those encountered during hydraulic fracturing operations. Generally, diverting agents may divert a portion of treatment fluids into a particular region in a subterranean zone. Diverting agents herein may also be capable of bridging narrow portions of fractures, such as those encountered during hydraulic fracturing or acidizing operations.

As the vinyl alcohol copolymer-based particulates herein are transported through the near wellbore fractures, the particles may stick together and bridge portions of the fracture(s). The dissolvable materials are capable of forming a gel upon hydration with low permeability and dissolve away in a short period of time (about 8 hours) at ultralow temperature (below 120° F.). In an embodiment, the dissolvable vinyl alcohol copolymer material may form a sticky gel or swellable gel. The sticky (i.e., adhesive) or swellable nature of the hydrated particles may keep the diversion material from spreading during transport, aid in bridging, and aid in the reduction of permeability within the diversion pack. The hydrated particles may form a gel with low permeability, which may not require particles in different sizes or the aid of fibers to achieve the low permeability. In some embodiments, degradation of the vinyl alcohol copolymer material may occur at about room temperature to 150° F. The dissolvable gelled material may expand the temperature window of diverting operations and improve the job efficiency compared to solely using degradable materials such as polylactide, or the like, which take months to degrade below 120° F. This material may also improve the ease of job operation since only one type of diverting material may need to be pumped during the job.

The dissolvable vinyl alcohol copolymer diverter material may comprise one or more non-deformable bridging particles. The diversion mixture may or may not contain degradable or non-degradable fibers. As the dissolvable diverter material is transported through the near wellbore fractures, the larger particles may begin to bridge starting accumulation of the diversion particles. During this process, small particles may fill the interpore space between the large particles as shown in FIG. 4. As the large and smaller particles pack off, the permeability may decrease and lead to near wellbore diversion. If fiber is used, it may help transport the diversion material, keep the diversion material from spreading during transport, aid in bridging, and/or aid in the reduction of permeability within the diversion pack.

Dissolvable diverter materials disclosed herein may comprise poly(vinyl alcohol) (PVOH) such as butenediol vinyl alcohol copolymer and/or a thermoplastic starch blend, and the like.

Particulates herein may be present in various particles sizes. Specifically, the vinyl alcohol copolymer material may be present in varying particle sizes, such as, for example, about 4.5 mm, 2.5 mm, 1 mm, 0.6 mm, 200 micron cross-sectional diameter.

Dissolvable diverter materials herein may exist as a particulate; the terms "particulate" or "particle" herein may refer to a solid 3D object with maximal dimension significantly less than 1 meter, for example. Further, a "dimension" of an object refers to the distance between two arbitrary parallel planes, each plane touching the surface of the object at least one point. A maximal or maximum dimension refers to the largest distance existing for the object between any two parallel planes, and a minimal or minimum dimension refers to the shortest distance existing for the object between any two parallel planes. In some embodiments, particulates used herein may be within a ratio between the maximal and the minimal dimensions (particle aspect ratio x/y) of less than 5 or even of less than 3, such as shown in FIG. 1.

The term "flake" may refer to a type of particulate as defined above. The flake may be a solid 3D object having a thickness smaller than its other dimensions, for example its length and width. Flake aspect ratios (diameter/thickness, length/thickness, width/thickness) may be in the range of from about 5 to about 50 or more, also as seen in FIG. 1. Pertaining to the flake, a flake aspect ratio may be the ratio of the length or width to the thickness. Any suitable ratio of length to width may be used herein.

The terms "particle size", "particulate size" or "flake size" may refer to the diameter of the smallest imaginary circumscribed sphere which may include such particulate or flake.

For the purposes of the present disclosure, components of treatment fluid may comprise particles and flakes, having homogeneous or non-homogeneous structure, made of porous or composite materials, for example.

Particles or flakes herein may be embodied as proppants. Such proppants may be natural or synthetic (including but not limited to glass beads, ceramic beads, sand, and bauxite), coated, or contain chemicals; and more than one can be used sequentially or in mixtures of different sizes or different materials. The proppant may be resin coated (curable), pre-cured resin coated, or have a corrosion resistant material formed thereon Proppants and gravels in the same or different wells or treatments can be the same material and/or the same size as one another and the term proppant is intended to include gravel in this disclosure. In some embodiments, any reasonable shaped particles may be used as proppants, such as rod-shaped particles, elongated particles, plate-like particles, or the like. Such particles may also have any reasonable cross-sectional shapes such as cylindrical or the like. In an embodiment, treatment fluids may comprise a blend rod-shaped, flake, or cylindrical cross-sectional shaped dissolvable materials. Enhanced bridging properties have been shown with a blend of both flake and cylindrical cross-sectional shaped particles.

The term "average size" may refer to an average size of solids in a group of solids of each type. In each group j of particles or flakes average size can be calculated as mass-weighted value $$\overline{L}_j = \frac{\sum\limits_{i=1}^{N} l_i m_i}{\sum\limits_{i=1}^{N} m_i}$$

Where N— number of particles or flakes in the group, $l_i$, (i=1 . . . N)— sizes of individual particles or flakes; $m_i$(i=1 . . . N)—masses of individual particles or flakes.

The term "hole" may refer to a 2D object of any geometry defined only by its perimeter. The term "hole diameter" or "hole size" may refer to the diameter of the biggest imaginary circle which is included in such hole.

While the embodiments described herewith may refer to well treatments, they may also be applicable to any well operations where zonal isolation occurs, such as drilling operations, workover operations, and the like.

Figure 2:
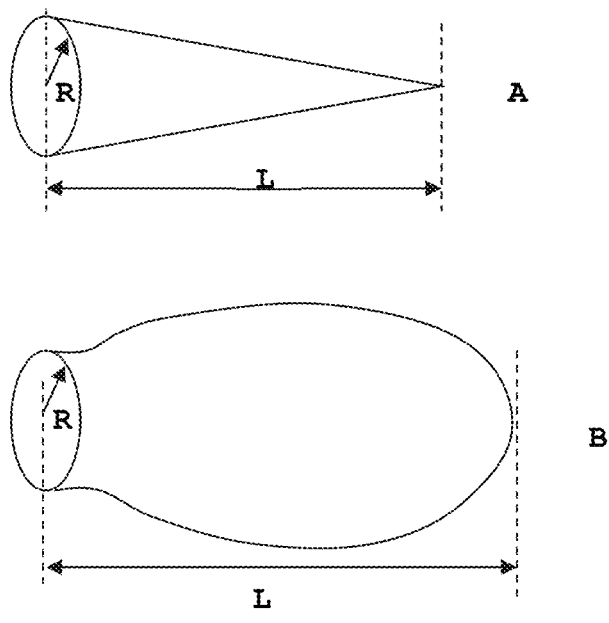
FIG. 2 illustrates shapes of perforation tunnels, in accordance with aspects of the present disclosure.

A method of treatment for diversion or for temporally zonal isolation is disclosed. The method uses a composition which may comprise blends of particles or blends of particles and flakes. According to an embodiment, the size(s) of the largest particles or flakes in the blends may be slightly smaller than the diameter of perforation holes in the zone to isolate or divert. According to a further embodiment, the size of particles or flakes in the blends may be larger than an average width of the void intended to be closed or temporally isolated. The average width of the void may be the smallest width of the void after the perforation hole or another entry in such void, at 10 cm, at 20 cm, at 30 cm or at 50 cm or at 500 cm, for example, when going into the formation from the wellbore. Such void may be a perforation tunnel, hydraulic fracture or wormhole, such as shown in FIG. 2. Introducing blends or compositions into perforation holes may result in jamming the largest particles in the voids proximate the wellbore. Thereafter, there may be an accumulation of other particles on the formed bridge. In one embodiment, the ratio between particles and flakes in the blends may be designed to reduce permeability of the formed plugs.

According to one aspect, treatment fluids herein may enable zonal isolation by creating plugs proximate to a wellbore. In comparison to traditional treatment diversion techniques, compositions herein may require lower amounts of diverting material. The following benefits exist with fluids herein: lower risk of wellbore plugging, lower risk of formation damage, and enhanced clean up. In an example where the diverting blend is designed for sealing perforation tunnels (e.g. slick-water treatments), the amount of diverting material required for diversion between several perforation clusters may be as low as several kilograms. Removal of diverting material is achieved either by self-degradation at downhole conditions or by introducing special chemical agents or by wellbore intervention.

Fibers

In some embodiments, treatment fluids herein may optionally contain fibers (either or both degradable and non-degradable). In embodiments, fibers may aid the bridging of PVOH particles. The fibers may be straight, curved, bent or undulated. Other non-limiting shapes may include hollow, generally spherical, rectangular, polygonal, etc. Fibers or elongated particles may be used in bundles. The fibers may have a length of less than about 1 mm to about 30 mm or more. In certain embodiments the fibers may have a length of 12 mm or less with a diameter or cross dimension of about 200 microns or less, with from about 10 microns to about 200 microns being typical. For elongated materials, the materials may have a ratio between any two of the three dimensions of greater than 5 to 1. In certain embodiments, the fibers or elongated materials may have a length of greater than 1 mm, with from about 1 mm to about 30 mm, from about 2 mm to about 25 mm, from about 3 mm to about 20 mm, being typical. In certain applications the fibers or elongated materials may have a length of from about 1 mm to about 10 mm (e.g. 6 mm). The fibers or elongated materials may have a diameter or cross dimension of from about 5 to 100 microns and/or a denier of about 0.1 to about 20, more particularly a denier of about 0.15 to about 6.

The fiber may be formed from a degradable material or a non-degradable material. The fiber may be organic or inorganic. Non-degradable materials are those wherein the fiber remains substantially in its solid form within the well fluids. Examples of such materials include glass, ceramics, basalt, carbon and carbon-based compound, metals and metal alloys, etc. Polymers and plastics that are non-degradable may also be used as non-degradable fibers. These may include high density plastic materials that are acid and oil-resistant and exhibit a crystallinity of greater than 10%. Other non-limiting examples of polymeric materials include nylons, acrylics, styrenes, polyesters, polyethylene, oil-resistant thermoset resins and combinations of these.

Degradable fibers may include those materials that can be softened, dissolved, reacted or otherwise made to degrade within the well fluids. Such materials may be soluble in aqueous fluids or in hydrocarbon fluids. Oil-degradable particulate materials may be used that degrade in the produced fluids. Non-limiting examples of degradable materials may include, without limitation, polyvinyl alcohol, polyethylene terephthalate (PET), polyethylene, dissolvable salts, polysaccharides, waxes, benzoic acid, naphthalene-based materials, magnesium oxide, sodium bicarbonate, calcium carbonate, sodium chloride, calcium chloride, ammonium sulfate, soluble resins, and the like, and combinations of these. Degradable materials may also include those that are formed from solid-acid precursor materials. These materials may include polylactic acid (PLA), polyglycolic acid (PGA), carboxylic acid, lactide, glycolide, copolymers of PLA or PGA, and the like, and combinations of these. Such materials may also further facilitate the dissolving of the formation in the acid fracturing treatment.

Also, fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) fibers available from Invista Corp., Wichita, Kans., USA, 67220. Other examples of useful fibers include, but are not limited to, polylactic acid polyester fibers, polyglycolic acid polyester fibers, polyvinyl alcohol fibers, and the like.

Polymer fibers may comprise polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

$$H-\{O-C(R1,R2)]_x-[C(R3,R4)]_y-C=O\}_z-OH$$

where,

R1, R2, R3, R4 is either H, linear alkyl, such as $CH_3$, $CH_2CH_3$, $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

In the appropriate conditions (e.g., pH, temperature, water content), polyesters described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used. Random, block, graft, and star- and hyper-branched aliphatic polyesters may also be used.

Other examples of polyesters of hydroxycarboxylic acids that may be used as polymeric acid precursors may include polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, MN, USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120° C. to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

Polymers herein may occur in crystalline form, and the extent of crystallinity may be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

Amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propanedioic acid, malonic acid, fumaric acid, maleic acid, succinic acid, glutaric acid, pentanedioic acid, adipic acid, phthalic acid, isophthalic acid, terephthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propanedioic acil chloride, malonyl chloride, fumaroyl chloride, maleyl chloride, succinyl chloride, glutaroyl chloride, adipoil chloride, phthaloyl chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of a case that one can encounter, the general structure for the linear homopolyesters may be:

$$H-\{O-R1-O-C=O-R2-C=O\}_z-OH$$

where,

R1 and R2, are linear alkyl, branched alkyl, aryl, alkylaryl groups; and z is an integer between 2 and 50,000.

Other examples of suitable polymeric acid precursors are the polyesters derived from phthalic acid derivatives such as polyethyleneterephthalate (PET), polybutyleneterephthalate (PBT), polyethylenenaphthalate (PEN), and the like.

Compositions herein may be made of blends of particles or blends of particles and flakes in a carrier fluid. The carrier fluid may be water including fresh water, produced water, seawater. Other non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. The carrier fluid may include an acid, including but not limited to, hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid may include a poly-amino-poly-carboxylic acid, a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

Such solid polymeric acid precursor material may be capable of undergoing an irreversible breakdown into fundamental acid products downhole. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The breakdown of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Another class of suitable solid polymeric acid precursor material that may be used includes polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a nonlimiting example of such byproducts. Nonlimiting examples of suitable polyamides include proteins, polyaminoacids, nylon, and poly(caprolactam). Another class of polymers that may be suitable for use are those polymers that may contain hydrolyzable groups, not in the polymer backbone, but as pendant groups. Hydrolysis of the pendant groups may generate a water-soluble polymer and other byproducts that may become sorbed into the cement composition. A nonlimiting example of such a polymer includes polyvinylacetate, which upon hydrolysis forms water-soluble polyvinylalcohol and acetate salts.

The particle(s) or the flake(s) can be embodied as material reacting with chemical agents. Some examples of materials that may be removed by reacting with other agents are carbonates including calcium and magnesium carbonates and mixtures thereof (reactive to acids and chelates); acid soluble cement (reactive to acids); polyesters including esters of lactic hydroxylcarbonic acids and copolymers thereof (can be hydrolyzed with acids and bases); active metals such as magnesium, aluminum, zinc and their alloys (reactive to water, acids and bases) etc. Particles and flakes may also be embodied as material that accelerate degradation of other component of the formed plug. Some nonlimited examples of it is using metal oxides (e.g. MgO) or bases (e.g. $Mg(OH)_2$; $Ca(OH)_2$) or salts of weak acids (e.g. $CaCO_3$) for accelerating hydrolysis of polyesters such as polylactic or polyglycolic acids.

The particle(s) or the flake(s) can be embodied as melting materials. Examples of meltable materials that can be melted at downhole conditions hydrocarbons with number of carbon atoms greater than 30 include, but are not limited to, polycaprolactones, paraffin, waxes, or carboxylic acids such as benzoic acid and its derivatives; etc. Wax particles may be used. The particles are solid at the temperature of the injected fluid, and that fluid cools the formation sufficiently that the particles enter the formation and remain solid. Aqueous wax may be commonly used in wood coatings, engineered wood processing, paper and paperboard converting, protective architectural and industrial coatings, paper coatings, rubber and plastics, inks, textiles, ceramics, and the like. They are made by such companies as Hercules Incorporated, Wilmington, Del., U.S.A., under the trade name PARACOL®, Michelman, Cincinnati, Ohio, U.S.A., under the trade name MICHEM®, and ChemCor, Chester, N.Y., U.S.A. Particularly suitable waxes include those commonly used in commercial car washes. In addition to paraffin waxes, other waxes, such as polyethylenes and polypropylenes, may also be used.

The particle(s) or the flake(s) can be embodied as water-soluble material or hydrocarbon-soluble material. The list of the materials that can be used for dissolving in water may include water-soluble polymers, water-soluble elastomers, carbonic acids, rock salt, amines, inorganic salts). List of the materials that can be used for dissolving in oil may include oil-soluble polymers, oil-soluble resins, oil-soluble elastomers, polyethylene, carbonic acids, amines, waxes).

The particle(s) and the flake(s) size may be chosen so the size of the largest particles or flakes is slightly smaller than the diameter of the perforation holes in casing and larger than the average width of the voids behind casing (perforation tunnels, fractures or wormholes). By perforation hole, we mean any type of hole present in the casing. This hole can be a perforation, a jetted hole, hole from a slotted liner, port or any opening in a completion tool, casing fluid exit point. According to a further embodiment, the size of particles or flakes in the blend is designed for reducing permeability of the plugs in the narrow voids behind casing (perforation tunnels, fractures or wormholes). In general, the particle or flake used will have an average particle size of less than several centimeters, preferably less than 2 cm, and more preferably less than 1 cm. In one embodiment, some particle or flake will have an average particle size of from about 0.2 mm to about 4.76 mm, preferable from about 0.5 mm to about 4.76 mm, more preferably from about 1 mm to about 4.76 mm and other particles will have an average particle size of from 0.04 mm to about 2 mm, preferable from 0.04 mm to about 1.5 mm, more preferably from 0.1 mm to 1 mm.

According to a further embodiment, the compositions may comprise particles or flakes with different particles/flakes size distribution. In one embodiment, the composition comprises particulate materials with defined particles size distribution.

In certain embodiments, the selection of the size for the first amount of particulates is dependent upon the characteristics of the perforated hole as described above: the size of the largest particles or flakes is slightly smaller than the diameter of the perforation holes in casing. In certain further embodiments, the selection of the size of the first amount of particulates is dependent upon the void behind casing: the size of the particles is larger than the average width of the voids behind casing (perforation tunnels, fractures or wormholes). In certain further embodiments, the selection of the size for the first amount of particulates is dependent upon the characteristics of the perforated hole and the void behind casing: the size of the largest particles or flakes is slightly smaller than the diameter of the perforation holes in casing and larger than the average width of the voids behind casing (perforation tunnels, fractures or wormholes). In certain further embodiments, the selection of the size for the first amount of particulates is dependent upon the characteristics of the desired fluid loss characteristics of the first amount of particulates as a fluid loss agent, the size of pores in the formation, and/or the commercially available sizes of particulates of the type comprising the first amount of particulates.

In certain embodiments, the selection of the size for the second amount of particulates is dependent upon the characteristics of the desired fluid loss characteristics of the second amount of particulates as a fluid loss agent, the size of pores in the formation, and/or the commercially available sizes of particulates of the type comprising the second amount of particulates.

In certain embodiments, the selection of the size for the second amount of particulates is dependent upon the characteristics of the desired fluid loss characteristics of the second amount of particulates as a fluid loss agent, the size of pores in the formation, and/or the commercially available sizes of particulates of the type comprising the second amount of particulates. The particle size is in the range of 10-100% of the size of the first amount of particulate, more preferably 20-80% of the size of the first amount of particulate.

In certain embodiments, the selection of the size particulates is dependent upon maximizing or optimizing a packed volume fraction (PVF) of the mixture of the first amount of particulates and the second amount of particulates. The PVF or packing volume fraction is the fraction of solid content volume to the total volume content. The particles size distribution required for maximizing PVF in narrow slot may be different from the particles size distribution required for maximizing PVF in a continuum system. Therefore, in certain embodiments, the selection of the size of particulates is dependent upon maximizing or optimizing a PVF of the mixture of the first amount of particulates and the second amount of particulates in narrow voids between 2 mm and 2 cm. In certain embodiments, the selection of the size of particulates is dependent upon maximizing or optimizing a PVF of the mixture of the first amount of particulates and the second amount of particulates in a fracture or slot with width of less than 20 mm. In certain embodiments, the particulates combine to have a PVF above 0.74 or 0.75 or above 0.80. In certain further embodiments the particulates may have a much higher PVF approaching 0.95.

In certain further embodiments, the composition may further include particulates/flakes having a third average particle size that is smaller than the second average particulate/flake size. In certain further embodiments, the same chemistry can be used for the second, third, fourth, or fifth average particulate/flake size. For the purposes of enhancing the PVF of the composition, additional particles may be added for other reasons, such as the chemical composition of the additional particles, the ease of manufacturing certain materials into the same particles versus into separate particles, the commercial availability of particles having certain properties, and other reasons understood in the art.

In certain further embodiments, the composition may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactolinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also, the crosslinked polymer can be made from a polymer comprising pendant ionic moieties, a surfactant comprising oppositely charged moieties, a clay stabilizer, a borate source, and a metal crosslinker.

The viscosifying agent may be a viscoelastic surfactant (VES). The VES may be selected from the group consisting of cationic, anionic, zwitterionic, amphoteric, nonionic and combinations thereof. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three-dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants may have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

mannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent may include polyvinyl polymers, polymethacrylamides, cellulose ethers, lignosulfonates, and ammonium, alkali metal, and alkaline earth salts thereof. More specific examples of other typical water-soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crossin which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Examples of suitable cationic VES's include cationic surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and R4 are the same as one another and contain from 1 to about 3 carbon atoms.

Amphoteric VES's are also suitable. Exemplary amphoteric VES systems may include amine oxides, amidoamine oxides, and the like. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The VES system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1 CON(R_2)CH_2 X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecenyl group, an octadecyl group, and a docosenoic group.

In some embodiments, the carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The composition may be used for carrying out a variety of subterranean treatments, including, but not limited to, drilling operations, fracturing treatments, diverting treatments, zonal isolation and completion operations (e.g., gravel packing). In some embodiments, the composition may be used in treating a portion of a subterranean formation. In certain embodiments, the composition may be introduced into a wellbore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the wellbore.

Figure 5:
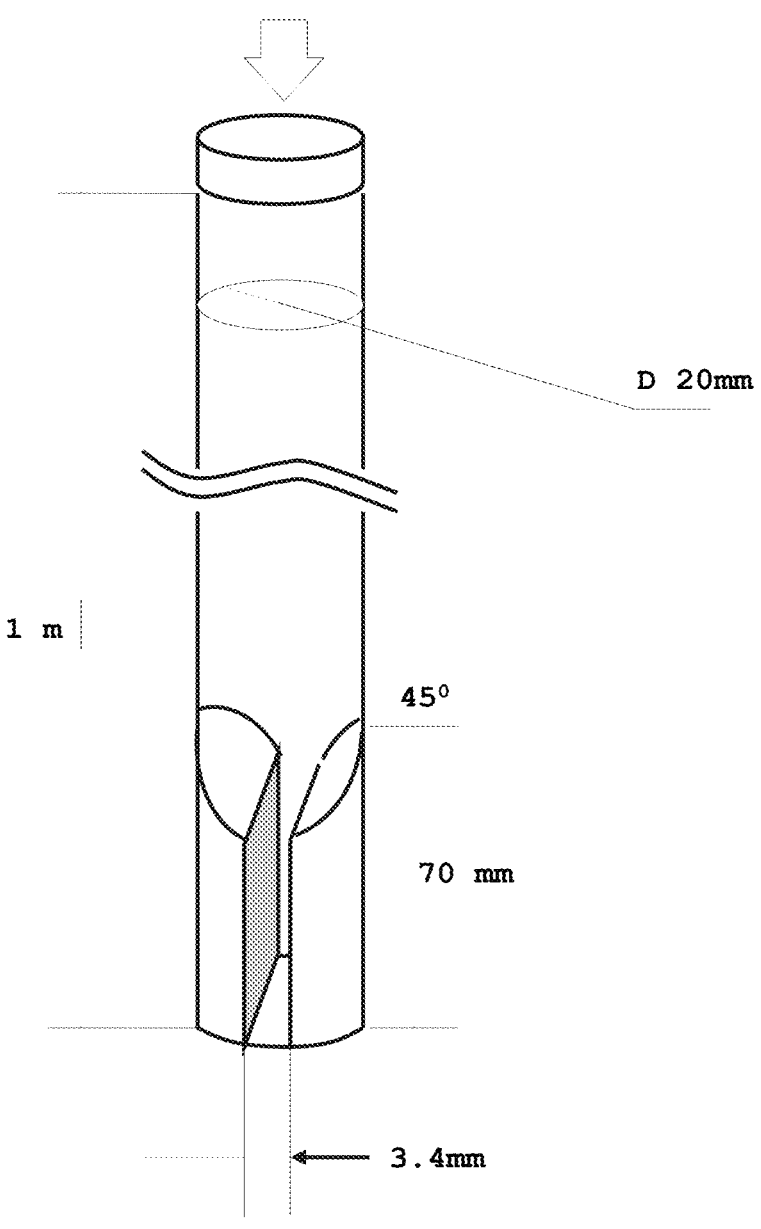
FIG. 5 depicts a laboratory setup for creating a plug, in accordance with aspects of the present disclosure.

Methods of wellsite and downhole delivery of the composition are the same as for existing particulate diverting materials. Typically, such particulate materials are introduced in the pumping fluid and then displaced into the perforations at high pumping rate. The list of injecting equipment may include various dry additive systems, flow-through blenders etc. In one embodiment the blends of particles may be batch mixed and then introduced into the treating fluid in slurred form. Simple flow-through injecting apparatuses may also be used as the one which scheme is shown in FIG. 5. In one embodiment, the composition may be delivered downhole in a conventional bailer or in a tool comprising bailer and a perforation gun. Another way of delivering the composition can be envisioned, for example, with a wireline tool, a drill string, through a slickline, with a coil tubing or microcoil, with a downhole tool or any type of other device introduced downhole and able to deliver the composition at a defined location. A microcoil or Microhole Coiled Tubing Drilling Rig (MCTR) is a tool capable of performing an entire "grass-roots" operation in the 0-5000 ft true vertical depth range including drilling and casing surface, intermediate, and production and liner holes.

As soon as the volume of diverting blend required for treatment diversion is relatively low, there is a risk that particles in the blend will be separated during pumping through the wellbore. It may result in poorer treatment diversion because of forming plugs of higher permeability than expected. To avoid this situation, long slugs with low concentration of diverting blends may be introduced in the treating fluid for minimizing the risk of particles separation in the main amount of the pumped blend. In one other embodiment, to avoid this situation diverting blends may be pumped in long slugs at low concentrations which will make volume of the diverting stage comparable with the volume of the wellbore. For example, for wells with wellbore volume of 200 bbl (32 m³) the volumes of the diverting stage that minimizes the risk of particles separation may be in the range of 20-100 bbl (3.2-16 m³). For 5-25 kg of diverting material it corresponds to the range of concentrations of 0.3-8 kg/m³.

Creating plugs of the proposed diverting blends happens by accumulating particles in the void space behind casing. Examples of such voids may be perforation tunnels, hydraulic fractures or wormholes. Plug creation consists of two steps. In the first step some largest particles in the diverting blend jam in the void creating a bridge. During the next step other particles are being accumulated at the formed bridge resulting in plug formation.

After treatment, the created plugs are removed. There are several methods that may be applied for removal of the created plugs. If the composition comprises degradable materials, self degradation will occur. If the composition comprises material reacting with chemical agents, those are removed by reacting with other agents. If the composition comprises melting material, melting may result in reduction in mechanical stability of the plug. If the composition comprises water soluble or hydrocarbon soluble materials. Plug removal may be achieved through physical dissolution of at least one of the components of the diverting blend in the surrounding fluid. Solubility of the mentioned components may be in significant dependence on temperature. In this situation post-treatment temperature recovery in the sealed zone may trigger the removal of the sealer. Disintegration of at least one component of the composition may occur. Plug removal may be also achieved through disintegration of the sealer into smaller pieces that will be flushed away. List of possible materials that may possess disintegration include plastics such as PLA, polyamides and composite materials comprising degradable plastics and non-degradable fine solids. It worth to mention that some of degradable material pass disintegration stage during degradation process. As an example only, PLA may turn into fragile materials before complete degradation.

Vinyl alcohol copolymers herein, such as butenediol vinyl alcohol copolymers, may expand the temperature window of diverting operations and possibly improve job efficiency compared with polylactide-based materials alone, which may take months to degrade at temperatures below 120° F. In addition to the relatively fast dissolution rate of vinyl alcohol copolymers herein, such as butenediol vinyl alcohol copolymers, the relative ease of job design may also improve job efficiency during operations. Vinyl alcohol copolymers herein, such as butenediol vinyl alcohol copolymers, may also improve the ease of operations since only one type of diverting material may be pumped during the job.

To facilitate a better understanding, the following examples of embodiments are given. In no way should the following examples be read to limit, or define, the scope of the overall invention.

EXAMPLES

Experiments were conducted to demonstrate the methods of treatment discussed herein.

Example 1

Figure 6:
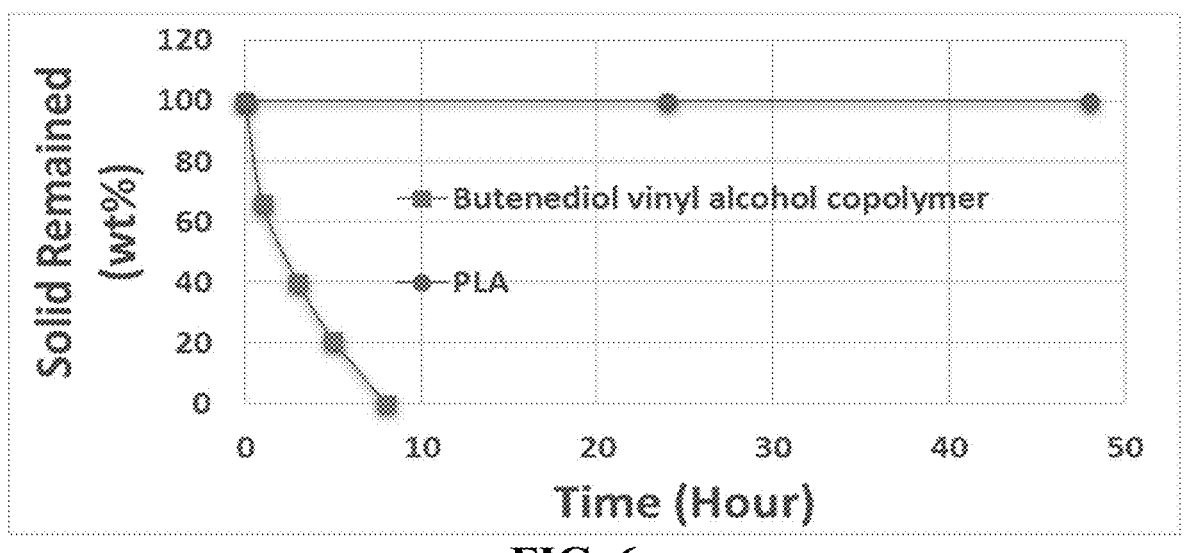
FIG. 6 depicts dissolution studies of butenediol vinyl alcohol copolymer in accordance with aspects of the present disclosure.

The present example is a dissolution study of butenediol vinyl alcohol copolymer in distilled water (DI). 1 g of the test material (e.g., vinyl alcohol copolymer) was added into 100 mL DI and placed in a heat source (e.g., oven) at around 100° C. After a certain period, the test material was filtered, dried and weighed. The weight of the test material was recorded to generate the dissolution rate as shown in FIG. 6.

Dissolvable materials herein, such as vinyl alcohol copolymer materials including butenediol vinyl alcohol copolymer, may provide a solution for ultralow temperature diversion in fracturing treatments. The relatively fast dissolution rate of such vinyl alcohol copolymer materials may improve the job efficiency during operations, with dissolution rates being enhanced by the addition of acid, such as HCl, for example.

Example 2

In the present study, thermoplastic starch (TPS) and plasticized butenediol vinyl alcohol (P-BVOH) were prepared by melt mixing technique(s), and the plasticization effect of glycerol on starch and BVOH with different composition was observed for optimized processing condition(s). Based on the preliminary study, TPS was blended with varying amounts of P-BVOH, such as in weight ratios including 100:0, 90:10, 80:20, 70:30, 60:40, and 50:50.

The foregoing disclosure and description is illustrative and explanatory, and it can be readily appreciated by those skilled in the art that various changes in the size, shape and materials, as well as in the details of the illustrated construction or combinations of the elements described herein can be made without departing from the spirit of the invention.

What is claimed is:

1. A method comprising:
introducing into a subterranean formation a treatment fluid comprising a dissolvable material capable of forming a gel upon hydration, wherein the dissolvable material comprises:
a plurality of particles;
a plurality of flakes; and a butenediol vinyl alcohol copolymer,
wherein the dissolvable material is configured to dissolve at or below about 150° F. and within about 8 hours, and
wherein the dissolvable material is about 0.5 wt % to about 5.0 wt % of a total weight of the treatment fluid.

2. The method of claim 1, wherein the dissolvable material is configured to dissolve between about room temperature and about 150° F.

3. The method of claim 1, wherein the treatment fluid creates a plug within the subterranean formation.

4. The method of claim 1, wherein the butenediol vinyl alcohol copolymer has a cylindrical cross-sectional shape.

5. The method of claim 1, wherein the dissolvable material consists essentially of the plurality of particles, the plurality of flakes, and the butenediol vinyl alcohol copolymer.

6. The method of claim 1, wherein the treatment fluid further comprises a plurality of fibers with a length of about 1 mm to about 30 mm.

7. The method of claim 1, wherein each particle of the plurality of particles comprises a cross-sectional diameter of and each flake of the plurality of flakes comprises an aspect ratio of about 5 to about 50.

8. The method of claim 1, wherein the plurality of particles comprise a water-soluble material or a hydrocarbon-soluble material, and wherein the plurality of flakes comprise a water-soluble material or a hydrocarbon-soluble material.

9. A well treatment fluid comprising:
a dissolvable material capable of forming a gel upon hydration, wherein the dissolvable material comprises:
a plurality of particles;
a plurality of flakes; and
a butenediol vinyl alcohol copolymer,
wherein the dissolvable material is configured to dissolve at or below about 150° F. and within about 8 hours, and
wherein the dissolvable material is about 0.5 wt % to about 5.0 wt % of a total weight of the well treatment fluid.

10. The well treatment fluid of claim 9, wherein the dissolvable material is configured to dissolve between about room temperature and about 150° F.

11. The well treatment fluid of claim 9, wherein the dissolvable material consists essentially of the plurality of particles, the plurality of flakes, and the butenediol vinyl alcohol copolymer.

12. A well treatment fluid comprising:
a dissolvable material configured to dissolve within about 8 hours, the dissolvable material comprising:
a plurality of particles;
a plurality of flakes; and
a butenediol vinyl alcohol copolymer,
wherein the butenediol vinyl alcohol copolymer is about 0.5 wt % to about 5.0 wt % of a total weight of the well treatment fluid.

13. The well treatment fluid of claim 12, wherein particles of the butenediol vinyl alcohol copolymer have a cylindrical cross-sectional or rod shape.

14. The well treatment fluid of claim 12, wherein the well treatment fluid consists essentially of the plurality of particles, the plurality of flakes, and the butenediol vinyl alcohol copolymer.

15. The well treatment fluid of claim 12 wherein the butenediol vinyl alcohol copolymer forms a plug within a subterranean formation.

* * * * *